US011014616B2

(12) United States Patent
Kitakata et al.

(10) Patent No.: US 11,014,616 B2
(45) Date of Patent: May 25, 2021

(54) HOLDING STRUCTURE FOR HOLDING A MOUNTED PART ON A FLOOR PANEL

(71) Applicant: TOYOTA JIDOSHA KABUSHIKI KAISHA, Toyota (JP)

(72) Inventors: Shintaro Kitakata, Nisshin (JP); Tsuyoshi Izuhara, Toyota (JP); Kentaro Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 16/207,439

(22) Filed: Dec. 3, 2018

(65) Prior Publication Data

US 2019/0176903 A1 Jun. 13, 2019

(30) Foreign Application Priority Data

Dec. 7, 2017 (JP) .............................. JP2017-235394

(51) Int. Cl.
*B62D 27/02* (2006.01)
*B62D 25/20* (2006.01)
*B62D 29/04* (2006.01)

(52) U.S. Cl.
CPC .......... *B62D 27/026* (2013.01); *B62D 25/20* (2013.01); *B62D 29/043* (2013.01); *B62D 29/046* (2013.01); *Y10T 403/472* (2015.01)

(58) Field of Classification Search
CPC .... B62D 27/026; B62D 25/20; B62D 29/043; B62D 29/046; Y10T 403/47; Y10T 403/471; Y10T 403/472; F16B 11/006
See application file for complete search history.

(56) References Cited

U.S. PATENT DOCUMENTS

| 6,030,030 A * | 2/2000 | Riddle | B60R 13/04 293/128 |
| 6,047,626 A * | 4/2000 | Lair | B62D 27/026 296/203.01 |
| 9,033,401 B1 * | 5/2015 | Donabedian | B62D 25/06 296/187.12 |
| 9,162,713 B2 * | 10/2015 | Donabedian | B29C 44/1228 |
| 9,281,505 B2 * | 3/2016 | Hihara | B62D 25/20 |
| 9,487,242 B2 * | 11/2016 | Terada | B62D 27/026 |
| 10,189,504 B2 * | 1/2019 | Terada | B62D 27/02 |

(Continued)

FOREIGN PATENT DOCUMENTS

| CN | 103465969 A | 12/2013 |
| CN | 205906061 U | 1/2017 |
| DE | 102012005507 A1 * | 11/2012 ........... B62D 27/026 |

(Continued)

*Primary Examiner* — Matthew R McMahon
(74) *Attorney, Agent, or Firm* — Oblon, McClelland, Maier & Neustadt, L.L.P.

(57) ABSTRACT

A holding structure for holding a mounted part on a floor panel includes: a floor panel that extends in a vehicle front-rear direction and in a vehicle width direction, the floor panel including an adhesion surface that is joined via an adhesive agent to a first portion of a body, and an anchoring portion that protrudes from a surface on an opposite side from the adhesion surface; a mounted part that is anchored to the anchoring portion; and a connecting component comprising a first portion that is fixed to the mounted part, and a second portion that is fixed to a second portion of the body.

2 Claims, 5 Drawing Sheets

(56) References Cited

U.S. PATENT DOCUMENTS

| | | | | |
|---|---|---|---|---|
| 10,214,249 B2 * | 2/2019 | Roddy | ................. | B62D 27/026 |
| 10,370,036 B2 * | 8/2019 | Toyota | ................... | B62D 25/02 |

FOREIGN PATENT DOCUMENTS

| JP | 2000-255458 | | 9/2000 |
|---|---|---|---|
| JP | 2008-068720 | A | 3/2008 |
| JP | 2010-208445 | A | 9/2010 |

\* cited by examiner

HOLDING STRUCTURE FOR HOLDING A MOUNTED PART ON A FLOOR PANEL

CROSS-REFERENCE TO RELATED APPLICATION

This application is based on and claims priority under 35 USC 119 from Japanese Patent Application No. 2017-235394 filed on Dec. 7, 2017, the disclosure of which is incorporated by reference herein.

BACKGROUND

Technical Field

The present disclosure relates to a holding structure for holding a mounted part on a floor panel.

Related Art

Japanese Patent Application Laid-open (JP-A) No. 2000-255458 discloses a holding structure that holds a silencer main body, including a sound absorbing material, on an engine cover. In the holding structure for the silencer main body described in this document, the silencer main body is held on the engine cover by providing a clamp on the engine cover, and anchoring a portion of the silencer main body on the clamp.

In a structure in which a mounted part is held on a floor panel, and the floor panel is joined to a body via an adhesive agent, it is desirable that the mounted part is able to be easily held on the floor panel, and that it be possible to set the thickness of the adhesive agent between the floor panel and the body to a desired thickness.

SUMMARY

The present disclosure has been conceived in view of the above-described circumstances, and provides a holding structure for holding a mounted part on a floor panel, in which the mounted part is able to be easily held on a floor panel, and that also enables the thickness of an adhesive agent between the floor panel and a body to be set to a desired thickness.

A first aspect of the present disclosure is a holding structure for holding a mounted part on a floor panel, including a floor panel that extends in a vehicle front-rear direction and in a vehicle width direction, the floor panel has an adhesion surface that is joined via an adhesive agent to a first portion of a body, and an anchoring portion that protrudes from a surface on an opposite side from the adhesion surface; a mounted part that is anchored to the anchoring portion; and a connecting component comprising a first portion that is fixed to the mounted part, and a second portion that is fixed to a second portion of the body.

According to the above aspect, the adhesion surface of the floor panel is joined via the adhesive agent to the portion of the body. In addition, the mounted part is anchored to the anchoring portion of the floor panel. As a consequence, the mounted part may be easily held on the floor panel. Moreover, the portion of the connecting component is fixed to the mounted part, and another portion thereof is fixed to another portion of the body. In other words, the mounted part is fixed via the connecting component to another portion of the body. As a consequence, a dimension from the portion of the connecting component to the adhesion surface of the floor panel is fixed, and a clearance between the adhesion surface of the floor panel and the portion of the body may be set to a desired clearance. As a result, the thickness of the adhesive agent between the adhesion surface of the floor panel and the body may be set to a desired thickness.

In the above aspect, the floor panel may be formed using a resin material, and the anchoring portion may be formed integrally with the floor panel.

According to the above structure, by using a resin material to form the floor panel, the anchoring portion may be formed integrally with the floor panel.

As described above, the holding structure for holding the mounted part on the floor panel according to the present disclosure enables easily holding the mounted part on the floor panel, and enables the thickness of an adhesive agent between the floor panel and the body to be set to a desired thickness.

DETAILED DESCRIPTION

Figure 1:
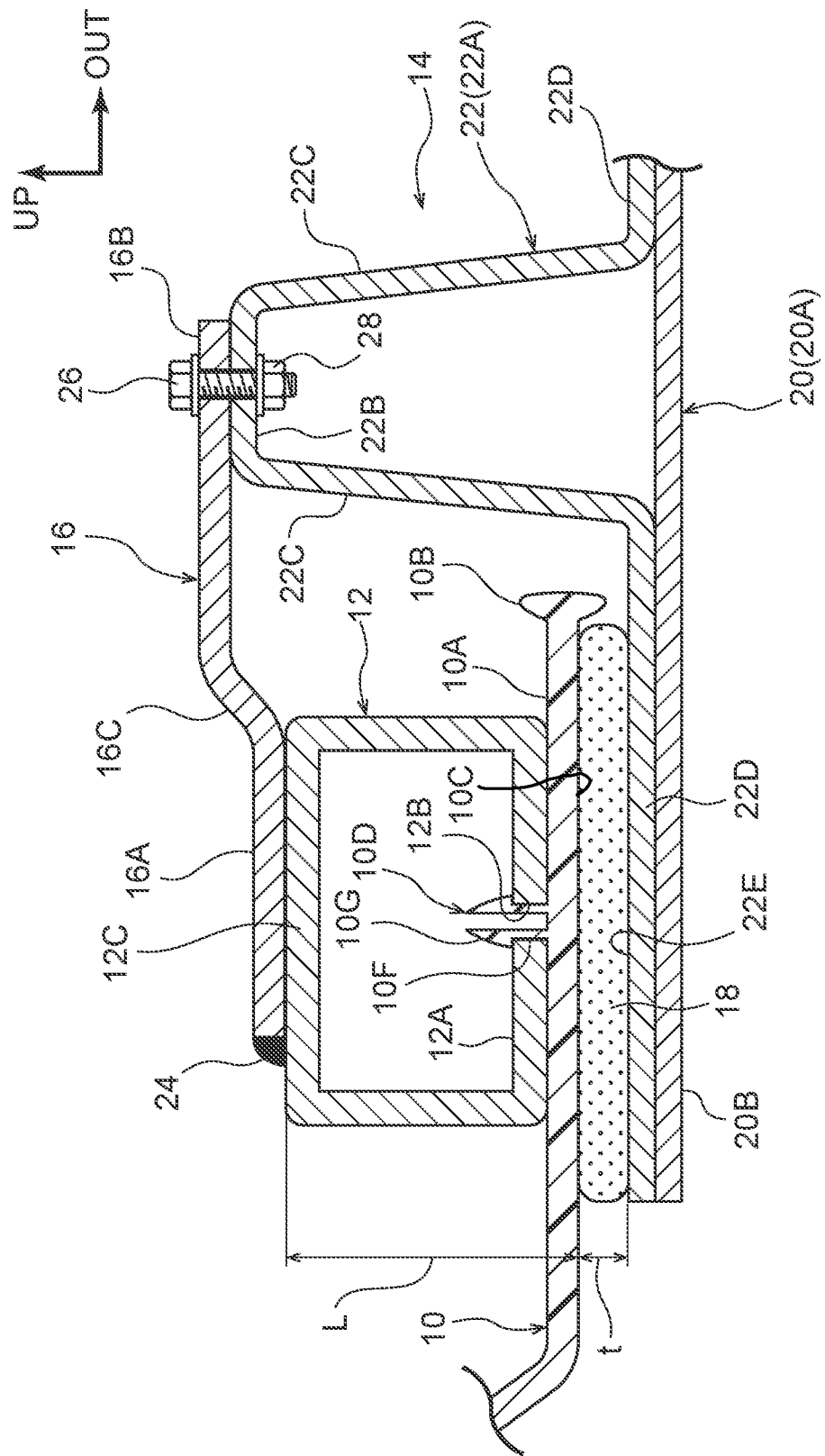
FIG. 1 is an enlarged cross-sectional view illustrating an enlargement of a floor to which a holding structure for holding a mounted part on a floor panel of the exemplary embodiment has been applied.

A floor structure of a vehicle in which a holding structure for holding a mounted part on a floor panel according to an exemplary embodiment has been applied will now be described using FIG. 1 through FIG. 5. Note that an arrow FR, an arrow OUT, and an arrow UP that are illustrated in the drawings respectively indicate a front side in a vehicle front-rear direction, an outer side in a vehicle width direction, and an upper side in a vehicle vertical direction. Additionally, if front-rear or vertical directions are used in the following description, unless specifically stated otherwise, these refer respectively to the front-rear directions of the vehicle and the vertical directions of the vehicle.

As is illustrated in FIG. 1, a holding structure for holding a mounted part 12 on a floor panel 10 of the exemplary embodiment is a structure that temporarily fixes the mounted part 12 to the floor panel 10, and then modularly mounts the floor panel 10, to which the mounted part 12 has been temporarily fixed, on a body 14. Hereinafter, firstly, a structure of the floor panel 10 will be described. Thereafter, a structure of the body 14 will be described, and finally, the mounted part 12 and a connecting component 16 will be described.

Structure of the Floor Panel 10

Figure 2:
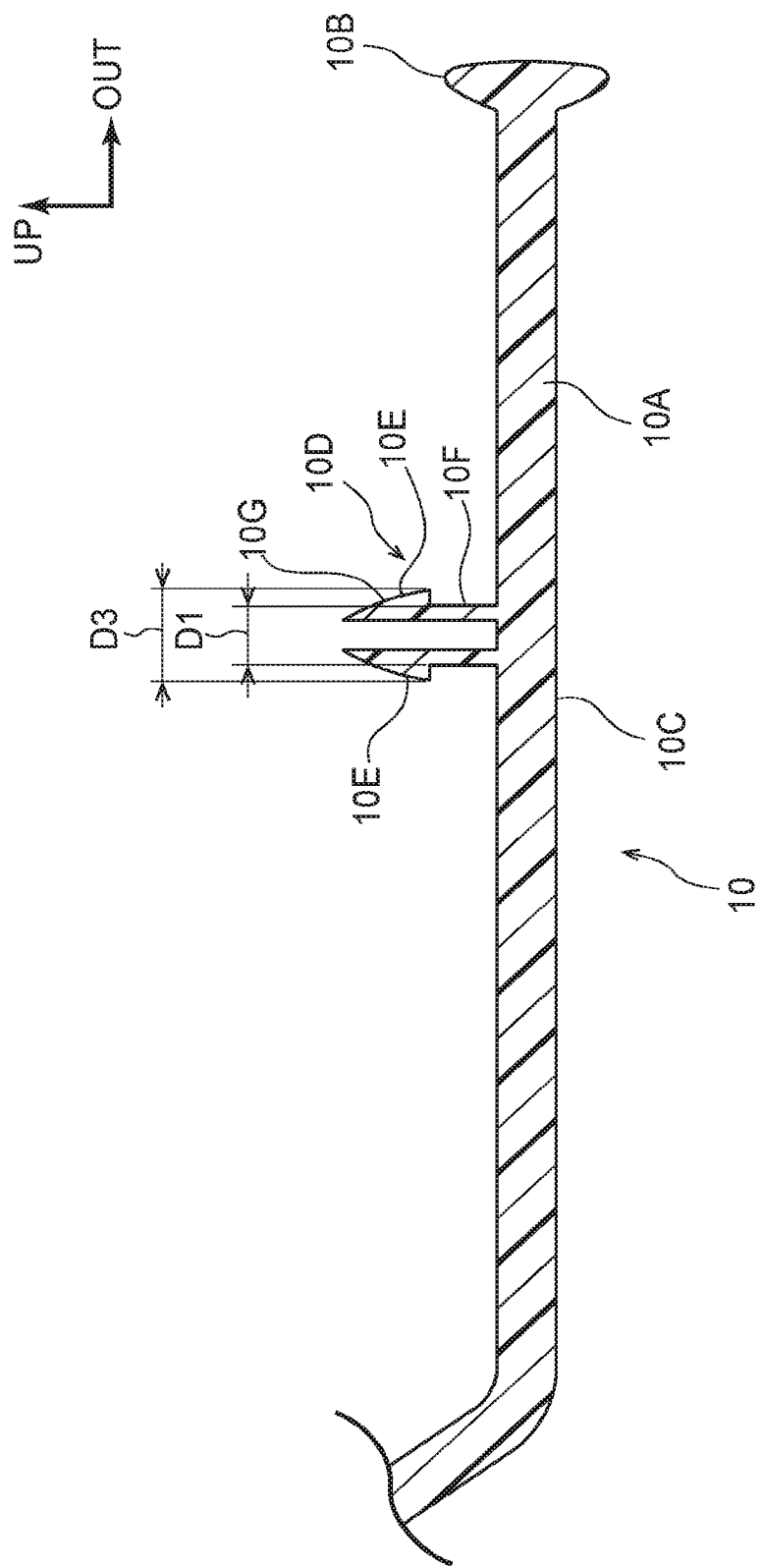
FIG. 2 is an enlarged cross-sectional view illustrating an enlargement of an end portion on an outer side in a vehicle width direction of the floor panel.

As illustrated in FIG. 2, the floor panel 10 is formed using a fiber-reinforced resin having glass fibers or carbon fibers internally provided so that the strength and rigidity thereof are increased. This floor panel 10 extends in both the front-rear direction and the vehicle width direction so as to form a floor surface of a cabin. An end portion 10A on one (first) side in the vehicle width direction of the floor panel 10 extends in both the front-rear direction and the vehicle width direction in such a way that a thickness direction thereof extends in the vehicle vertical direction. Note that an end on the one side in the vehicle width direction of the floor panel 10 is formed as a widened portion 10B whose dimension in the vertical direction has been widened.

A surface on a lower side of the end portion 10A on the one side in the vehicle width direction of the floor panel 10 is formed as an adhesion surface 10C that is joined via an adhesive agent 18 (see FIG. 1) to a portion of the body 14 (described below).

A clamp portion 10D, which serves as an anchoring portion, is provided standing upright so as to protrude in an upward direction from an upper surface of the end portion 10A on the one side on the vehicle width direction of the floor panel 10. This clamp portion 10D is formed integrally with the floor panel 10, and has a structure which is divided into six portions in a circumferential direction around the direction in which it protrudes. The six portions forming the clamp portion 10D are respectively referred to as clamp portion structural pieces 10E.

Figure 3:
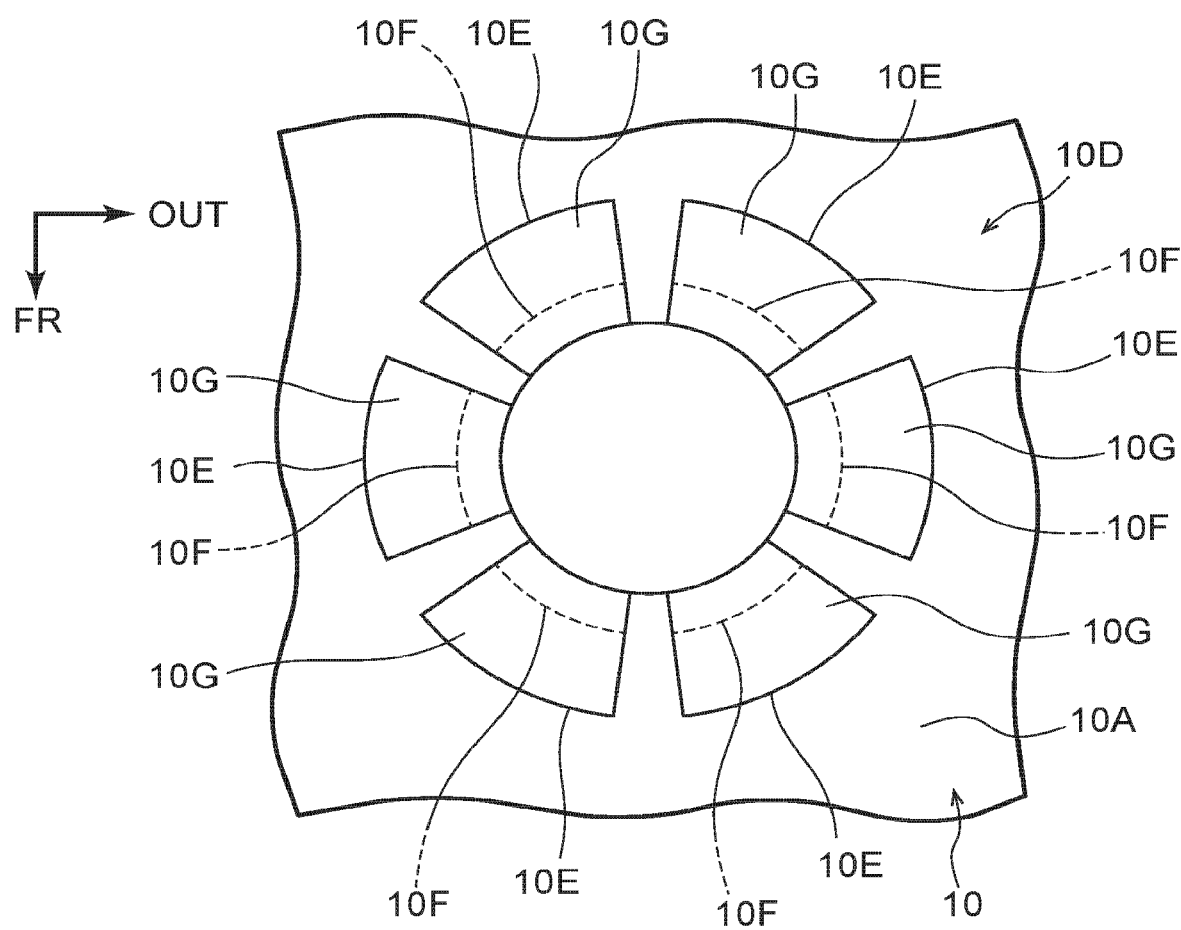
FIG. 3 is a plan view illustrating a clamp portion provided on the floor panel.
Figure 4:
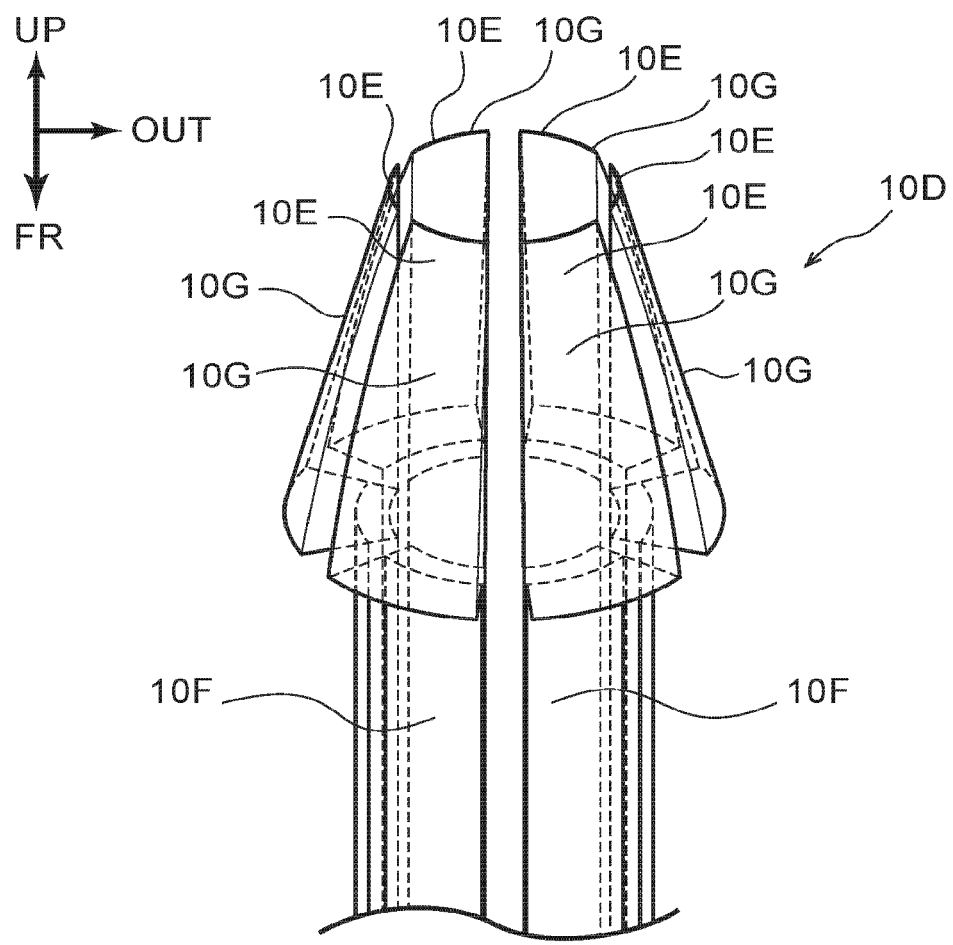
FIG. 4 is a perspective view illustrating a clamp portion provided on the floor panel.
Figure 5:
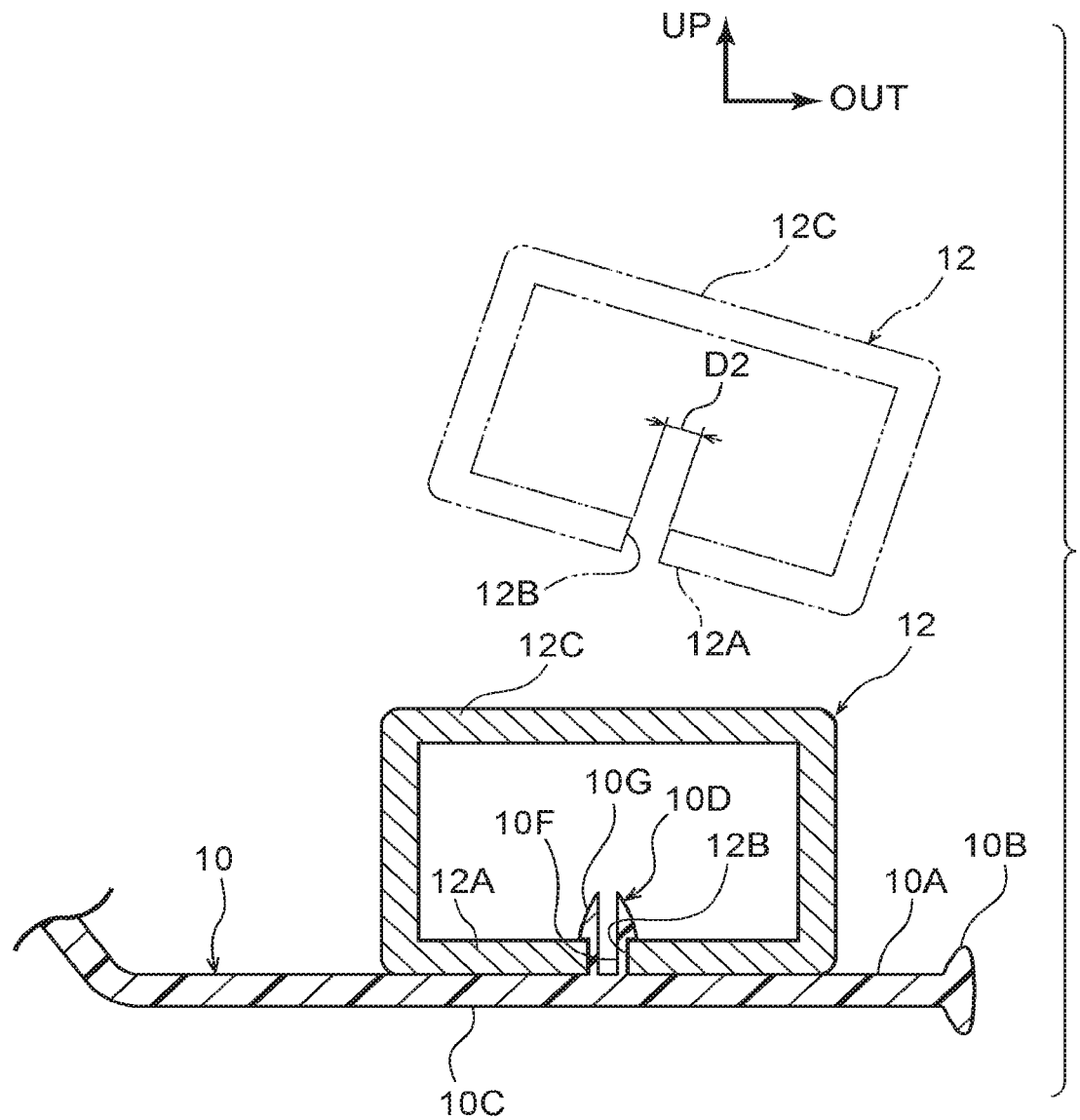
FIG. 5 is an enlarged cross-sectional view schematically illustrating a procedure in which the mounted part is anchored to the clamp portion provided on the floor panel.

As illustrated in FIG. 2 through FIG. 4, a lower end side of the clamp portion 10D is formed as a circular-cylinder-shaped fixing portion 10F that extends in the vehicle vertical direction, and whose outer diameter D1 is formed so as to correspond in size to an inner diameter D2 of an anchoring hole 12B (see FIG. 5) of the mounted part 12 (described below). An upper end side of the clamp portion 10D is formed as a stopper portion 10G that is formed substantially in a truncated cone shape that becomes gradually narrower approaching an upper end thereof, and whose outer diameter D3 on the fixing portion 10F side thereof is formed larger in size than the inner diameter D2 of the anchoring hole 12B (see FIG. 5) of the mounted part 12. In addition, as is illustrated in FIG. 2 and FIG. 5, when the stopper portion 10G of the clamp portion 10D is inserted into the anchoring hole 12B of the mounted part 12, each of the clamp portion structural pieces 10E is tilted (i.e., is elastically deformed) so that the outer diameter on the fixing portion 10F side of the stopper portion 10G is reduced. As a consequence, the stopper portion 10G of the clamp portion 10D is able to pass through the anchoring hole 12B in the mounted part 12. Once the stopper portion 10G of the clamp portion 10D has passed through the anchoring hole 12B in the mounted part 12, each of the clamp portion structural pieces 10E returns to its original state (i.e., is elastically restored). As a consequence, the stopper portion 10G of the clamp portion 10D is caught by an edge portion of the anchoring hole 12B of the mounted part 12, and the mounted part 12 may be prevented or suppressed from coming free from the clamp portion 10D.

Structure of the Body 14

As is illustrated in FIG. 1, the body 14 has a portion where a first panel component 20 and a second panel component 22, which are formed by performing press-working processing on a steel sheet material, are joined together. A portion 20A on another (second) side in the vehicle width direction of the first panel component 20 extends in the front-rear direction and in the vehicle width direction, and a thickness direction thereof extends in the vertical direction. In addition, a portion 22A on the other (second) side in the vehicle width direction of the second panel component 22 is formed having a substantially hat-shaped cross-section whose lower side is open. Specifically, the portion 22A on the other side in the vehicle transverse direction of the second panel component 22 is provided with an apex wall portion 22B that extends substantially in parallel with, and at a distance in the vertical direction from, the portion 20A on the other side in the vehicle width direction of the first panel component 20, a pair of side wall portions 22C that are bent respectively from an end portion on the one (first) side and an end portion on the other (second) side in the vehicle width direction of the apex wall portion 22B so as to extend towards the lower side (i.e., towards the first panel component 20 side), and bottom wall portions 22D that extend respectively towards the one side and towards the other side in the vehicle width direction from lower ends of the pair of side wall portions 22C, and are joined to the first panel component 20. The end portion 10A on the one side in the vehicle width direction of the floor panel 10 is joined via the adhesive agent 18 to an upper surface 22E of a portion where the end portion 20B on the other side in the vehicle width direction of the first panel component 20 and the bottom wall portion 22D of the second panel component 22 are mutually superimposed and are joined together.

Structure of the Mounted Part 12

The mounted part 12 is formed using a rectangular steel pipe or the like. Note that the mounted part 12 is a part that is mounted on the floor panel 10, and is a part such as, for example, a seat rail or the like. A circular anchoring hole 12B that is anchored to the clamp portion 10D is formed in a portion 12A on the lower side of the mounted part 12.

Structure of the Connecting Component 16

The connecting component 16 is formed by performing press-working processing on a steel sheet material. An end portion 16A on the other side in the vehicle width direction of this connecting component 16 is fixed by welding to a portion 12C on the upper side of the mounted part 12. The weld portion is indicated by the symbol 24. An end portion 16B on the one side in the vehicle width direction of the connecting component 16 is fixed via a bolt 26 and a nut 28 to the apex wall portion 22B of the second panel component 22. A step portion 16C is formed in an intermediate portion in the vehicle width direction of the connecting component 16. As a consequence, the end portion 16A on the other side in the vehicle width direction of the connecting component 16 is disposed on the lower side of the end portion 16B on the one side in the vehicle width direction thereof.

Operations and Effects of the Exemplary Embodiment

Next, operations and effects of the exemplary embodiment will be described.

As is illustrated in FIG. 1, in the exemplary embodiment, by inserting the clamp portion 10D of the floor panel 10 through the anchoring hole 12B in the mounted part 12, the mounted part 12 is anchored to the clamp portion 10D of the floor panel 10. As a result, the mounted part 12 is able to be easily held on the floor panel 10. The end portion 16A on the other side in the vehicle width direction of the connecting component 16 is joined in advance by welding to the portion 12C on the upper side of the mounted part 12.

After the adhesive agent 18 has been coated onto the upper surface 22E of the portion where the end portion 20B on the other side in the vehicle width direction of the first panel component 20 and the bottom wall portion 22D of the second panel component 22 are mutually superimposed and are joined together, the end portion 16B on the one side in the vehicle width direction of the connecting component 16 is then fixed via the bolt 26 and the nut 28 to the apex wall portion 22B of the second panel component 22. In this state, a dimension L from the end portion 16A on the other side in the vehicle width direction of the connecting component 16 to the adhesion surface 10C of the floor panel 10 is fixed, and a clearance between the adhesion surface 10C of the floor panel 10 and the upper surface 22E of the portion where the end portion 20B on the other side in the vehicle width direction of the first panel component 20 and the bottom wall portion 22D of the second panel component 22 are mutually superimposed and are joined together may be set to a desired clearance. As a result, once a thickness t of the adhesive agent 18 between the adhesion surface 10C of the floor panel 10 and the upper surface 22E of the portion where the end portion 20B on the other side in the vehicle width direction of the first panel component 20 and the bottom wall portion 22D of the second panel component 22 are mutually superimposed and are joined together has been set to a desired thickness, the two may be adhered together.

Furthermore, in the exemplary embodiment, because the floor panel 10 is formed using a fiber-reinforced resin, which is a type of resin material, the clamp portion 10D may be formed integrally with the floor panel 10. Therefore, tasks such as attaching a clamp portion as a separate component to the floor panel 10 are no longer necessary, and the number of parts forming peripheral portions of the floor panel 10 may be reduced.

Note that, in the exemplary embodiment, an example is described in which the floor panel 10 is formed using a fiber-reinforced resin, which is a type of resin material, however, the present disclosure is not limited to this. For example, it is also possible for the floor panel 10 to be formed using a metal plate such as a steel plate or the like.

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A holding structure for holding a mounted part on a floor panel, comprising:
   a floor panel that extends in a vehicle front-rear direction and in a vehicle width direction, the floor panel comprising an adhesion surface that is joined via an adhesive agent to a first portion of a body, and an anchoring portion that protrudes from a surface on an opposite side from the adhesion surface;
   a mounted part that is anchored to the anchoring portion; and
   a connecting component comprising a first portion that is fixed to the mounted part, and a second portion that is fixed to a second portion of the body, wherein:
   the floor panel is formed using a resin material,
   the anchoring portion is formed integrally with the floor panel,
   the mounted part includes left and right side surfaces and an upper surface and a lower surface connecting the left and right side surfaces, the upper surface of the mounted part is connected to the connecting component, and the lower surface of the mounted part is connected to the floor panel,
   the mounted part is sandwiched between a lower surface of the connecting component and an upper surface of the floor panel, and
   the floor panel is sandwiched between the lower surface of the mounted part and an upper surface of the body.

2. The holding structure for holding a mounted part on a floor panel according to claim 1, wherein the body is provided with an apex wall portion and side wall portions, and the apex wall portion is connected to the connecting component.

* * * * *